(12) United States Patent
Evers

(10) Patent No.: US 8,047,230 B2
(45) Date of Patent: Nov. 1, 2011

(54) SYSTEM FOR THE CHEMICAL/PHYSICAL TREATMENT OF A FLUID

(75) Inventor: Johannes Albertus Evers, Bilthoven (NL)

(73) Assignee: Outotec Oyj, Espoo (FI)

( * ) Notice: Subject to any disclaimer, the term of this patent is extended or adjusted under 35 U.S.C. 154(b) by 465 days.

(21) Appl. No.: 11/663,541

(22) PCT Filed: Sep. 30, 2005

(86) PCT No.: PCT/NL2005/000709
§ 371 (c)(1),
(2), (4) Date: Sep. 25, 2007

(87) PCT Pub. No.: WO2006/036062
PCT Pub. Date: Apr. 6, 2006

(65) Prior Publication Data
US 2008/0163943 A1    Jul. 10, 2008

(30) Foreign Application Priority Data
Sep. 30, 2004  (NL) .................................... 1027143

(51) Int. Cl.
*F16K 11/074*   (2006.01)
*B01D 15/18*    (2006.01)
(52) U.S. Cl. ............... 137/625.46; 137/625.11; 210/264
(58) Field of Classification Search ................. 137/597, 137/625.29, 625.32, 625.47, 625.46, 625.11; 251/310; 210/264, 278
See application file for complete search history.

(56) References Cited

U.S. PATENT DOCUMENTS

| | | | | |
|---|---|---|---|---|
| 2,600,099 A |   | 6/1952  | Detrez | |
| 2,706,532 A | * | 4/1955  | Ringo et al. | 137/625.46 |
| 3,005,467 A | * | 10/1961 | Suchoza et al. | 137/625.11 |
| 3,052,263 A | * | 9/1962  | Gordon | 137/625.24 |
| 4,259,288 A | * | 3/1981  | Welch | 422/63 |
| 4,705,627 A | * | 11/1987 | Miwa et al. | 210/264 |
| 5,676,826 A | * | 10/1997 | Rossiter et al. | 210/264 |
| 5,827,358 A | * | 10/1998 | Kulish et al. | 96/115 |
| 2004/0094216 A1 | * | 5/2004 | Wagner | 137/625.46 |
| 2004/0099592 A1 |   | 5/2004 | Rochette | |

FOREIGN PATENT DOCUMENTS

| | | |
|---|---|---|
| GB | 761690 | 11/1956 |
| WO | 02/30570 A1 | 4/2002 |

OTHER PUBLICATIONS
International Search Report dated Dec. 16, 2005.

* cited by examiner

*Primary Examiner* — John Rivell
(74) *Attorney, Agent, or Firm* — Buchanan Ingersoll & Rooney PC

(57) ABSTRACT

System for the chemical/physical treatment of a fluid in which a distributor valve has been installed for the feed/discharge of fluid to/from various reactors. The distributor valve consists of a plate valve with stationary plate and rotary plate. A cylindrical body provided with a number of axial bores that change into radial bores and emerge in the wall of a stationary housing adjoins the rotary plate and rotates therewith. A number of inlets/outlets located one after the other viewed in the axial direction are provided on the stationary housing. According to the invention the various radial bores in the cylindrical body are provided with a fluid via axial bores, based on a single valve plate.

10 Claims, 2 Drawing Sheets

SYSTEM FOR THE CHEMICAL/PHYSICAL TREATMENT OF A FLUID

BACKGROUND

The present invention relates to a system for the chemical/physical treatment of a fluid according to the preamble of Claim 1.

Such a system is disclosed in WO 02/30570. In this publication a construction is described consisting of a rotary cylindrical body that also has the function of a rotary valve plate. For this purpose measures are taken on sides, being in the axial direction opposite, of the rotary cylindrical body, as a result of which it is possible to supply a fluid in the axial direction. There are axial bores in the cylindrical body that change into radial bores. These radial bores emerge at the wall of the cylinder. This cylinder wall is accommodated in a housing in a sealed manner and corresponding bores are made in this housing. Lines that are connected to a feed/discharge and/or reactors join onto both the stationary valve plates and the bores in the housing.

The aim with such a construction is always to provide various reactors with a changing fluid stream. All sorts of processes can be carried out by this means and in general these always involve regeneration of the reactors.

In the state of the art constructions are known where the reactors are constructed as columns that are arranged on a rotary frame. With this arrangement there is always a valve plate construction.

Using a construction as described in WO 02/30570 only the cylindrical body has to turn and rotation of the columns is no longer necessary, as a result of which an appreciable simplification can be obtained with, as a consequence, a saving in costs and freedom in positioning and design of reactors.

However, it is not easily possible to address a large number of reactors with the construction according to WO 02/30570. After all, in the embodiment shown the fact of the matter is that it is impossible or virtually impossible to achieve complete sealing of the construction. A large number of surfaces perpendicular to one another must be sealed with respect to one another, which, although it may be theoretically possible, in practice will always be beset with difficulties. According to this WO 02/30570 publication, increasing the number of reactors that can be connected is achieved by making feed/discharge openings in the stationary/rotary valve plate in the radial direction at various distances from the centre of rotation. However, if it is desired to keep the size of such a valve plate down and the complexity thereof may not be too great, it will not be possible to employ such a solution when using a larger number of columns.

GB 761 690 describes a distributor valve provided with two plate parts or end plates with axial feed openings that merge into radial channels. These radial channels all emerge axially at the same level. Furthermore, orifices of channels that are connected internally and do not emerge at a plate part or end plate are made in the cylinder wall. A corresponding construction as far as functioning is concerned is shown in U.S. Pat. No. 2,600,099.

The aim of the present invention is to provide a system that does not have these disadvantages and with which it is possible to address a larger number of columns with a single distributor valve.

This aim is realised with a system as described above having the characterising features of Claim 1.

SUMMARY

According to the invention the cylindrical body is provided with a number of bores arranged around the periphery. These can be provided in the form of circle, but in order to increase the capacity it is also possible to make a number of groups of bores in different circles. As in the case of the construction according to WO 02/30570, a first bore extends in the axial direction and is then converted to a radial bore. However, in contrast to WO 02/30570 a second axial bore extends from the same valve plate, which second axial bore changes into a radial bore a greater distance away from the stationary/rotary valve plate and then emerges in the wall of the housing. As a result only two sealing surfaces are still required: the first sealing surface is between the stationary and rotary valve plate and the second sealing surface between the cylinder wall and the seat in the housing. A third sealing surface, as is present in the state of the art, is not required. As a result it is possible to provide complete sealing. Likewise it is possible to operate a very large number of reactors by means of the present invention. After all, the cylindrical body can be made to any length without this being associated with structural problems. By way of example a number of five connections is mentioned, but it will be understood that very much larger numbers can easily be used.

It will be understood that the cylindrical body and the valve plate can be integrated.

Furthermore, the present invention makes it possible to construct the cylindrical body in a modular fashion. That is to say the cylindrical body is built up from cylindrical discs, each consisting of a number of continuous axial bores and each with a radial bore that emerges into the cylindrical wall. If there are groups of axial bores positioned in various circles, it is possible to make different radial bores that emerge in different positions on the wall of the cylindrical body. The housing will be provided with corresponding bores. With this arrangement the discs are arranged such that they cannot be turned with respect to one another. This can be achieved in a simple manner by providing these internally with a central accommodating opening with toothing or the like. The drive shaft is provided with corresponding teeth. By means of suitable choice of the number of teeth, the discs can be arranged in specific discrete positions on the drive shaft. As a result all discs can be made identical and by positioning in different positions with respect to the shaft the desired throughput/discharge can be obtained. The (plastic) discs can be arranged in contact with one another and sealed with simple sealing means, such as O-rings, at the location of the bores. Because there is no mutual movement between the discs, such a seal can be achieved easily.

With such a system in general one of the ends of the passage through the cylindrical body will be permanently provided with fluid and one of the ends in specific discrete desired positions. According to a preferred embodiment of the present invention, a peripheral channel is delimited between the housing and the cylindrical wall so that this part provides continuous fluid communication between the housing and the radial orifice in the cylindrical body. Selective control of the fluid stream takes place at the location of the valve plate. This can be achieved by making openings that are precisely opposite one another but also by making slots so that fluid communication exists in a number of positions. Furthermore, the construction can be designed for indexing operation. As a result of the relatively low mass inertia of the rotary valve plate and the cylindrical body, such an indexing movement of the cylindrical body/valve plate is possible in a simple manner.

The invention also relates to a system as described above, wherein there are two such distributor valves, for the feed to the various reactors and one for the discharge from the various reactors. In order to provide sealing pressure in an optimum manner between the rotary valve plate and the stationary valve plate, with such a construction positioning is provided such that rotary valve plates of each of the distributor valves are either as close as possible to one another or are as far apart as possible. A common drive shaft can be driven by a common motor.

BRIEF DESCRIPTION OF DRAWING FIGURES

The invention will be explained in more detail below with reference to an illustrative embodiment shown in the drawing. In the drawing.

DETAILED DESCRIPTION

Figure 1:
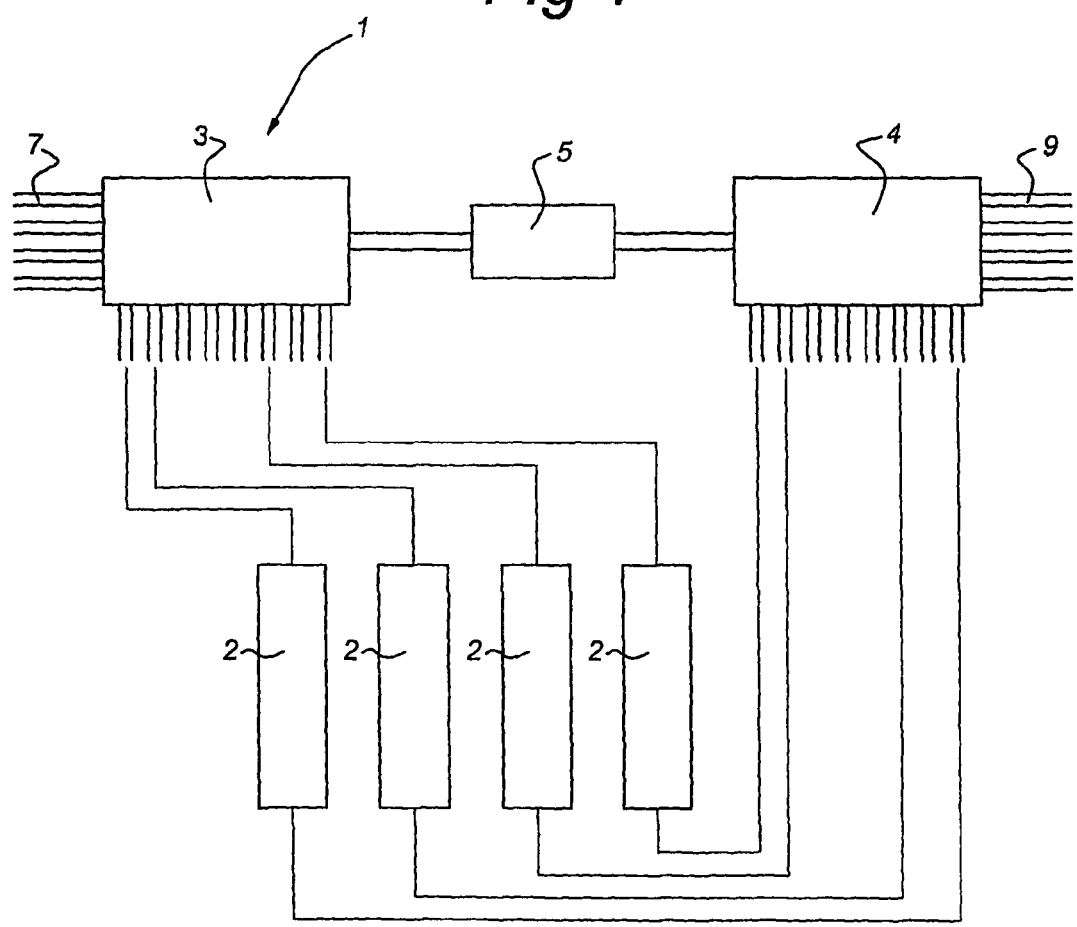
FIG. 1 shows, diagrammatically, the system according to the invention.

In FIG. 1 the system according to the present invention is indicated in its entirety by 1. This consists of a number of reactors or columns 2. A fluid, which has to be treated in some way or other, is fed through these. Because of the process, switching of the reactors has to be changed regularly, a regeneration step frequently being incorporated.

The various fluid streams are controlled via an inlet distributor valve 3 and an outlet distributor valve 4. The fluid supplied moves via feed 7 and distributor valve 3 to reactors 2 and from the latter via distributor valve 4 to discharges 9. Rotation of the distributor valves is effected by means of a motor 5.

Figure 2:
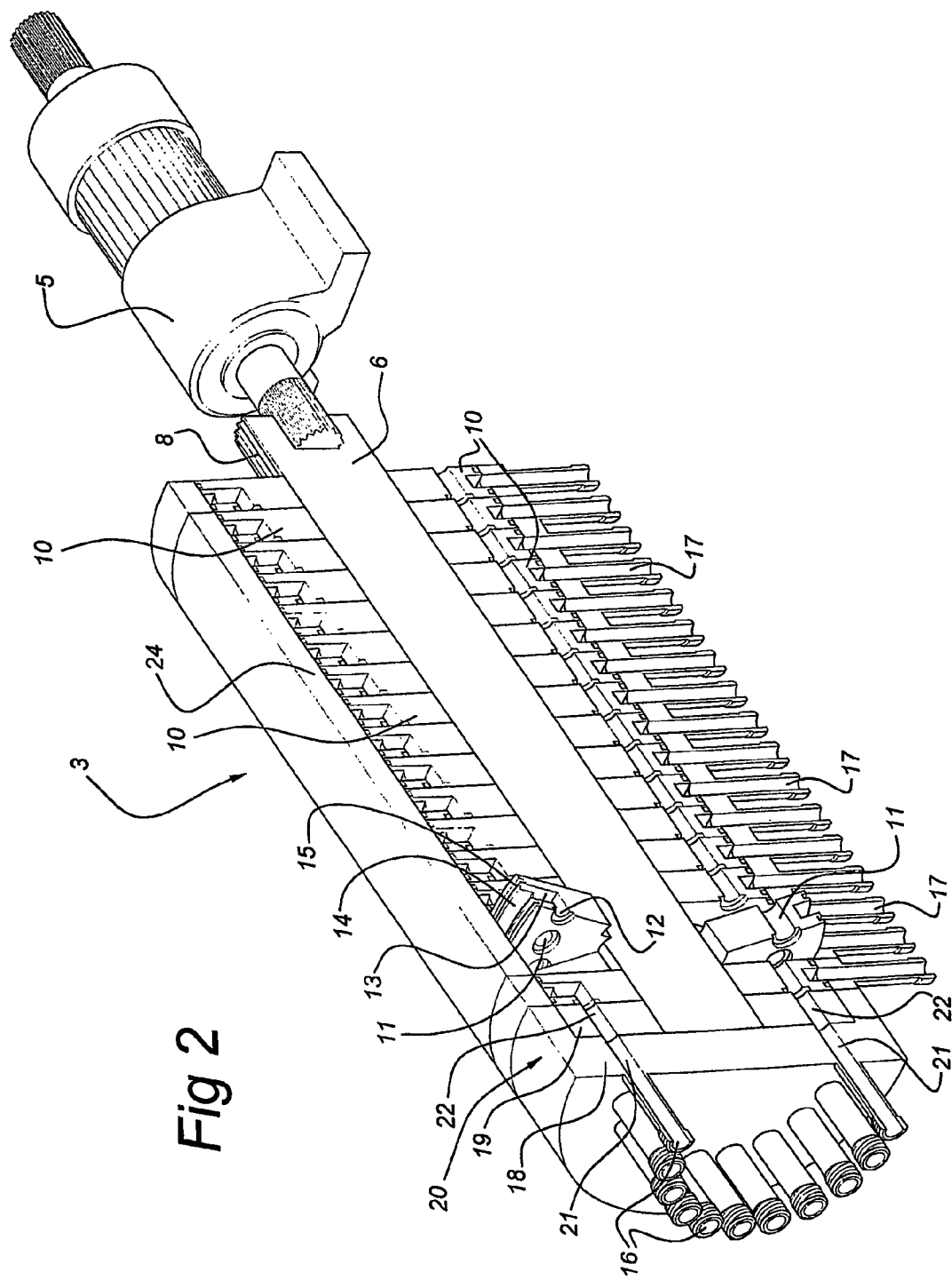
FIG. 2 shows details of one of the distributor valves according to FIG. 1.

Distributor valve 3 is shown in detail in FIG. 2. It will be understood that distributor valve 4 is implemented in a corresponding manner, but in mirror image.

A shaft 6 is connected to motor 5. This shaft is provided with key toothing 8. There are a number of discs 10 provided with interacting toothing, as a result of which these discs can be positioned on the shaft 6 in a large number of discrete positions. These discs 10 are accommodated inside a stationary housing 24. Each disc 10 is provided with a number of continuous axial bores 11 that are located on a circle. One of the bores, indicated by 12, terminates blind and adjoins a radial bore 13 that emerges in an annular channel 14 made on the outer periphery of the disc 10. There are seals 15 that provide a seal between the disc 10 and the housing 24. Housing 24 is provided with a number of outlets 17 located in axial direction one after the other. It must be understood that these outlets 17 can also function as inlet. As FIG. 2 shows, a number of discs 10 are positioned one after the other. In each of the discs there is always a single bore 12 that is continuously in communication with the relevant outlet/inlet 17 via the channel 14 concerned.

The bores 11, 12 emerge in a rotary valve part 19. The passages in the latter are indicated by 22. There is a stationary valve plate or an end plate 18 with passages 21 in communication with inlets 16. It will be understood that the inlets 16 can also be designed as outlets. This rotary valve plate 19 is connected to shaft 6 such that it cannot turn with respect to the latter. The combination consisting of the stationary valve plate 18 and rotary valve plate 19 is indicated by 20.

The device describes above functions as follows. Fluid feed lines are connected to the inlets 16. With this arrangement one of the inlets 16 will always be connected to a fluid feed that differs from the other fluid feeds. Of course, it is also possible that a different fluid feed can be fitted to each connection to provide linking for a serial circuit.

Fluid that enters through inlet 16 reaches opening 21 of stationary valve plate 18. Depending on the position of the rotary valve plate 19, fluid will enter the rotary valve plate 19 through one of the openings 22. Depending on this, the fluid will pass through one of the bores 11 of the pack of discs 10. Depending on the position, one of the discs with bore 12 will be reached and the fluid will emerge in one of the annular channels 14 and thus emerge in one of the outlets 17. On further rotation, when the next position is reached the flow of the fluid will take place in another way.

It will be understood that with the construction described above there is substantial freedom for connection of various fluid lines and thus direction of various processes. As a result it is possible to direct very different processes starting from standard components. A modular construction is easily possible by the use of discs that make up the cylindrical body. In this way highly complex processes can be implemented in a simple manner using the distributor valves according to the present invention.

As a result of arranging the distributor valves 3 and 4 in mirror image, as described above, and the use of a continuous shaft 6, the pressure on the opposing rotary valve plates can be evened out. As a result sealing can be provided in a simple manner.

Following the above variants will be immediately apparent to those skilled in the art that consist of a combination of what is shown here and constructions known in the state of the art, more particularly in the state of the art where use is made of rotary columns and rotary valve plates. Such combinations are obvious and fall within the scope of the appended claims.

The invention claimed is:

1. System for the chemical/physical treatment of a fluid, comprising a feed for said fluid, a number of treatment reactors for said fluid and a discharge for said treated fluid, wherein a rotary distributor valve, which connects the feed and/or discharge to the reactors, is installed in the feed and/or discharge, wherein said distributor valve comprises a plate combination, said plate combination including a rotary plate part having an axis of rotation and a stationary plate part, each of which extend perpendicularly to the axis of rotation of the rotary plate part, wherein the stationary plate part is connected to said feed and/or discharge and the rotary plate part is connected to said discharge and/or feed, wherein said stationary plate part is provided with openings which expose openings in the rotary plate part to thereby expose passages in a rotary cylindrical body depending on the rotational position of the rotary plate part, wherein the rotary plate part is connected to the rotary cylindrical body, the axis of rotation/cylinder axis of which is coincident with the axis of rotation of said rotary plate part, wherein the passages in said cylindrical body are connected to the openings of the rotary plate part, which passages emerge in the radial direction at orifices in a cylinder wall of the cylindrical body, wherein said cylindrical body is accommodated in a stationary housing in a sealed manner, which housing is provided with openings extending radially, which openings can be brought in line with the orifices in the cylinder wall, wherein there are at least two orifices/openings in said cylinder wall and said housing located axially some distance apart, wherein each of the passages connected to said orifices located axially some distance apart emerges in said stationary plate part.

2. System according to claim 1, comprising at least five openings located in different positions in the axial direction in said cylinder wall and at least four essentially axial bores, which form the passages connected to said plate combination.

3. System according to claim 2, wherein said cylindrical body comprises a number of cylindrical discs connected such that they are not able to turn with respect to one another, each disc being provided with at least one axial passage and a radial channel that extends to the periphery thereof.

4. System according to claim 3, wherein a channel between said cylindrical wall and a seat in said housing has been made at the location of an opening or orifice.

5. System according to claim 4, wherein said channel extends around the complete periphery of said cylindrical wall.

6. System according to claim 5, wherein the system comprises two of said rotary distributor valves, said rotary distributor valves having a common drive shaft, wherein one valve connects the feed to the reactors and the other connects the discharge to the reactors, wherein the plate combinations are arranged adjacent to or opposite one another.

7. System according to claim 1, wherein said cylindrical body comprises a number of cylindrical discs connected such that they are not able to turn with respect to one another, each disc being provided with at least one axial passage and a radial channel that extends to the periphery thereof.

8. System according to claim 1, wherein a channel between said cylindrical wall and the seat in said housing and extending through it has been made at the location of an opening or orifice.

9. System according to claim 8, wherein said channel extends around the complete periphery of said cylindrical wall.

10. System according to claim 1, wherein the system comprises two of said rotary distributor valves, said rotary distributor valves having a common drive shaft, wherein one valve connects the feed to the reactors and the other connects the discharge to the reactors, wherein the plate combinations are arranged adjacent to or opposite one another.

* * * * *